United States Patent [19]

Bissell

[11] Patent Number: 4,896,538

[45] Date of Patent: Jan. 30, 1990

[54] CONVERTIBLE SOCKET FOR PRESSURE GAUGE

[75] Inventor: Robert D. Bissell, Orange, Conn.

[73] Assignee: Dresser Industries, Inc., Dallas, Tex.

[21] Appl. No.: 255,124

[22] Filed: Oct. 7, 1988

[51] Int. Cl.[4] .............................................. G01L 7/04
[52] U.S. Cl. ...................................... 73/741; 73/431; 73/756
[58] Field of Search .................. 73/741, 742, 743, 756, 73/431, 732; 137/705, 269

[56] References Cited

U.S. PATENT DOCUMENTS

| 517,451 | 4/1894 | Gartrell | 73/714 |
|---|---|---|---|
| 1,494,496 | 5/1924 | Manning | 73/739 |
| 2,457,401 | 12/1948 | Rupley | 73/37.5 |
| 2,676,490 | 4/1954 | Willach | 73/411 |
| 2,821,855 | 2/1958 | Le Van | 73/732 |
| 2,925,734 | 2/1960 | Gorgens | 73/362.2 |
| 3,041,880 | 7/1962 | McCarvell et al. | 73/420 |
| 3,091,966 | 6/1963 | Huston et al. | 73/362.2 |
| 3,115,033 | 12/1963 | Blowers | 73/116 |
| 3,405,225 | 10/1968 | McHugh, Jr. | 174/52 |
| 3,738,157 | 6/1973 | Sekizawa | 73/420 |
| 3,881,358 | 5/1975 | Wolrges | 73/420 |
| 4,192,193 | 3/1980 | Schnell | 73/741 |
| 4,420,981 | 12/1983 | Schoen | 73/756 |

FOREIGN PATENT DOCUMENTS 979925  7/1982  U.S.S.R. .

Primary Examiner—Donald O. Woodiel
Attorney, Agent, or Firm—Daniel Rubin

[57] ABSTRACT

An improved pressure gauge construction in which the pressure inlet to the Bourdon tube is supplied through a tubular socket having alternate connections for either a low-connected or back-connected gauge arrangement. An adaptor is provided for threaded mounting one end into a selected of said socket connections while the other end extends outward of the gauge housing with a thread of choice for connecting to a fluid pressure source. A threaded plug seals the unused socket connection while an interlock secures the installed adaptor against unthreading removal.

8 Claims, 2 Drawing Sheets

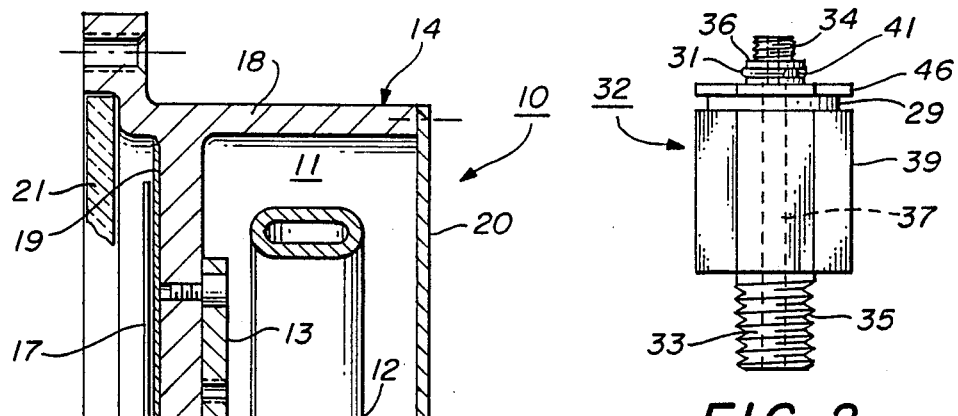
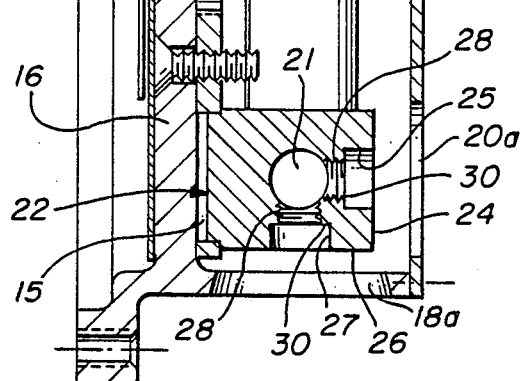
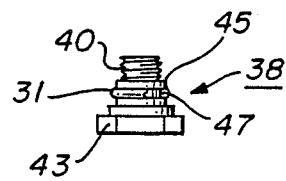
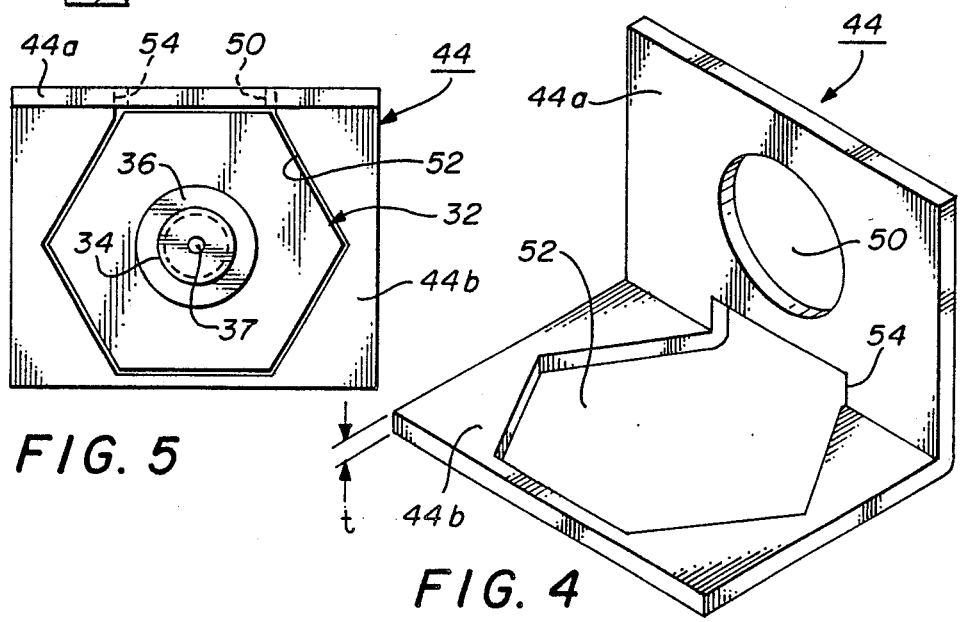

# CONVERTIBLE SOCKET FOR PRESSURE GAUGE

FIELD OF THE INVENTION

This invention relates to a pressure gauge and primarily to a threaded socket and adaptor assembly for converting the external pressure connection to either a lower-connected or a back-connected connected arrangement while having the versatility of adapting the gauge to an appropriate threaded connection for any one of various common pressure connections.

DESCRIPTION OF THE PRIOR ART

Pressure gauges are typically manufactured with the external Bourdon tube pressure connection projecting either through the lower portion of the cylindrical case (lower-connected) or through the rear of the case (back-connected) with the selected arrangement depending on the application. To accommodate this difference, gauges are made with two different pressure element assemblies, one for each style of connection. In addition, various connection threads for mounting the pressure connection of the gauge to the piping at the gauge site are used by different customers. Typically, this variation requires that a separate pressure element assembly be manufactured for each thread type desired.

Thus, for instance, in one line of pressure gauges, as presently manufactured by the corporate assignee of the present invention, each different pressure range, requires a different assembly, which typically can extend to twenty-five units or more. (Each range uses a different sized pressure element and therefore a distinct and different part.) The two most common pressure connections are a ¼ NPT and ½ NPT and with the requirement for providing the availability for both lower and back-connected versions, it is evident that one hundred different pressure element assemblies can be required.

For twenty-five assembly units, it can be seen that each different threaded connection requires fifty different pressure element assemblies (i.e. one back-connected and one lower-connected for each pressure range). In addition to the quantity of pressure element assemblies required, a complete inventory of complete calibrated gauges is complicated by the proliferation of gauges necessary to be available to accommodate other potential variables. This proliferation of different part numbers adversely affects not only the manufacturer but also the local distributor of the gauges who, in most instances, is not able to accurately forecast which style connection, operating range, and connection thread will likely be required by the ultimate customer. These assemblies, therefore, are not generally stocked and must be made to order.

Thus, the need can be seen for a single pressure element assembly that has, in its design, the versatility to convert between a lower or back-connected style and can also be assembled with a thread adaptor, which itself can be provided with a variety of different connecting threads. With such a design, the part quantities and gauge inventories would be greatly reduced. In the example above, instead of one hundred different pressure element assemblies to satisfy the twenty-five operating ranges, only twenty-five element assemblies would be necessary for the different pressure ranges. By being convertible between a lower or back-connected arrangement, they could through an adaptor, be connected to any of various threads at the pressure site.

By virtue of a common pressure element assembly having either lower or back-connected capabilities and an adaptor for connecting it to various threads, distributors can stock the pressure element assemblies in the ranges required. At the time of sale, the distributor merely assembles the adaptor, having the proper threads, in the proper style in order to provide the customer with a desired connection location and connection threads. This minimizes inventory by merely stocking a reasonable quantity of the pressure element assemblies and the adaptor units permitting the distributor to assemble them in the desired configuration on site thereby eliminating the previous necessity to custom order the particular assembly from the manufacturer.

SUMMARY OF THE INVENTION

The present invention provides a pressure gauge which includes a circular case, a base socket mounted within a rear cavity of the case and a Bourdon tube fixed to the base socket in fluid communication with an opening from the interior of the base socket. The base socket has a rear face and a lower face having exterior threaded openings extending inward from an unthreaded counterbore. The openings intersect each other on axes of 90° while also intersecting the internal opening to the tube. The threaded openings are each alike defining an internally threaded bore communicating inward from the counterbore in which to receive an o-ring seal. The back wall and lower portion of the casing, adjacent the back face and lower face of the socket respectively, define the counterbore in axial concentric alignment with the threaded openings of the base socket.

To effect interchangeability, the tubular adaptor has an axial passage therethrough and terminates at one end with an externally threaded extension for threaded engagement within either of the threaded openings in the base socket. Behind the threads is an annular groove supporting an elastomeric o-ring gasket. The opposite end of the adaptor is threaded selectively as required to mate with the threads necessary for the customer's application. A plug member having a threaded end and groove with gasket similar to the base socket engaging threaded end of the adaptor, is provided so that whichever threaded opening in the base socket is not utilized by the adaptor can be sealed by the plug member.

The gauge assembly, as described above, also includes means for locking the adaptor in threaded engagement within the base socket once this assembly is completed. According to the invention, two alternative locking arrangements are available. One locking arrangement is provided by an "L"-shaped bracket in facing engagement with the back face and bottom face of the base socket. The bracket has shaped openings through each respective leg that, in final assembly of the bracket, adaptor, and plug, engages the peripheral walls of the adaptor to prevent it from becoming unthreaded while being retained in this position by the plug member. The alternative arrangement includes a threaded lock screw or jam screw projecting through the body of the adaptor to, be jammed when tightened in a set screw manner against the opposing face of the base socket.

Thus, a pressure gauge assembly is provided, which requires a distinct assembly for each capacity pressure range, but otherwise affords a flexibility and versatility that can be utilized for either lower-connected or back-connected engagement. With the adaptor, the appropriate threads can be selected for the mounting so as to eliminate any necessity for multiple, pre-assembled gauge assemblies to accommodate the various mounting requirements.

DESCRIPTION OF THE DRAWINGS

FIG. 1 is a side-elevational view of the gauge assembly hereof with portions of the case and portions of the base socket broken away for clarity;

FIG. 2 is an elevational view of one adaptor embodiment having an external configuration for engagement with a locking bracket;

FIG. 3 is an elevational view of a plug member;

FIG. 4 is an isometric view of the locking bracket for the adaptor of FIG. 2;

FIG. 5 is a top plan view of the bracket and adaptor in assembled relationship;

DESCRIPTION OF THE PREFERRED EMBODIMENT

Figure 6:
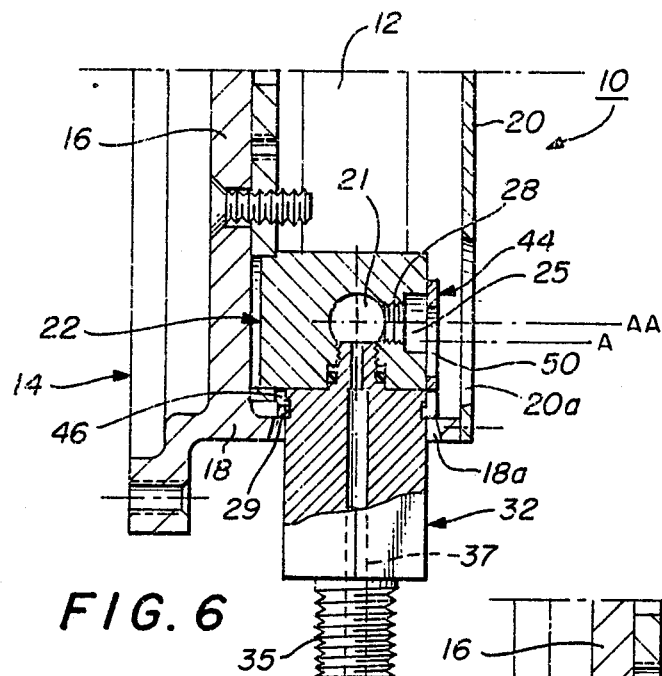
FIG. 6 is a side-elevational view similar to FIG. 1 with the adaptor and locking bracket in assembled relationship to the base socket.

Referring to FIG. 1, it is seen that the pressure gauge 10 of the present invention, includes a pressure sensitive Bourdon tube 12 enclosed in the rear cavity 11 of a generally cylindrical case 14 having a front face 16, an integral cylindrical side wall 18 and closed by a rear cover or plate 20. Bourdon tube 12 operates in a well known manner in response to pressure changes received internally for displacing a pointer 17 relative to a calibrated dial plate 19. A transparent window 21 normally secured by a bezel (not shown) enables observation of the pointer position relative to the dial plate.

The fixed inlet end of the Bourdon tube is integrally attached (as by welding) to a base socket member 22. The socket member in turn is welded within a recess 15 to a mounting standard 13 that is secured to the cavity face of wall 16 so as to locate the base socket in the lower portion of the cavity within the case 14. The base socket 22 has a vertically oriented rear planar face 24 and a lower horizontally oriented planar face 26, with the planes of the respective faces being generally at right angles to each other. Each face respectively identifies identical counterbore openings 25 or 27 the axes of which intersect with each other and with a transverse bore 21 in the base socket communicating internally with the Bourdon tube. Each opening 25/27 identifies an internally concentric threaded portion 28 and an enlarged diameter shoulder 30 for approach of either adaptor 32 or plug 38 as will be described. The rear cover 20 and the cylindrical wall 18 have openings 20a and 18a respectively in alignment with and adjacent the respective planar faces of the base socket 22.

Referring now to FIG. 2, a generally tubular adaptor member 32 is shown having on one end an externally threaded projection 34, with threads common to the internally threaded portions 28 of the base socket 22. An adjacent enlarged shoulder 36 provides for approach toward shoulder 30 of the base socket. Behind the shoulder 36 is an annular groove 41 containing a confined elastomeric o-ring 31. For purposes of assembly, an annular recess 29 is defined in hexagonal body 39 behind a forward body portion 46. The opposite end of the adaptor member 32 defines a threaded extension 33 having threads 35 selected for a mated connection to the customer's pressure tap, which threads will be suitably appropriate for the requirements of each individual customer. An axial bore 37 extends through the adaptor member and is open through both opposite ends for fluid communication therethrough.

Referring to FIG. 3, a plug member 38 is shown also having a thread projection 40 and an adjacent enlarged shoulder 45 for approaching the shoulder 30 of the base socket. An annular groove 47 similarly contains a confined elastomeric o-ring 31. The plug member 38 includes a wrench head 43 having an external configuration capable of being turned or engaged by a wrench or the like as does the main body 39 of the adaptor 32 as shown in FIG. 2. (The external shape of each is, in the preferred embodiment, a hexagonal configuration, for example.)

Thus, referring to FIG. 6, it is seen that the adaptor member 32 can optionally be inserted through either the opening 20a or 18a in the rear cover 20 or the case wall 18 for threaded, engagement with either the rear face 24 or lower face 26 of the base socket 22 depending upon whether the pressure gauge is to be operated in a lower-connected or a back-connected application. The plug member 38 then occupies the unused threaded opening 25 or 27 of the base socket 22. Whichever arrangement is selected, the counterbores each provide for a circumferentially uniform compression force being imposed radially inward against the confined o-ring 31 to effect a sealing against any potential for leakage through their respective openings. Should any axial adjustment of either the adaptor or plug become necessary, the compressed o-ring in this arrangement continues to maintain the required seal against leakage.

Thus, a gauge 10 and adaptor 32 assembly is provided that permits a single gauge assembly to be either back-connected or lower-connected depending upon the selected placement of the adaptor 32 which itself can have an external connecting thread 35 suitable for the customer's application. A plug 38 would be common for all applications to occupy the unused threaded opening 25/27 of the base socket 22.

Also, as seen in FIG. 6, a bracket member 44 is in a preliminarily assembled position for preventing when in its fully assembled position, unthreading disengagement of the adaptor 32 from the base socket member 22. The adaptor 32 of FIG. 2, as shown therein, is particularly externally configured to accept the bracket member 44 in a preliminary position about recess 29. This permits relative rotation between the adaptor and the bracket for the adaptor to be threaded between the threads 34 of the adaptor, as seen in FIG. 2, and the internal threads 28 in the base socket. The axial dimension of recess 29 is slightly greater than the thickness "t" of the bracket member 44 to permit non-binding relative rotation of adaptor 32 as long as the bracket member 44 and the recess 29 of the adaptor member are coincidentally aligned.

As more clearly seen in FIG. 4, the bracket member 44 is an L-shaped member (preferably sheet metal) having in one leg 44a a circular opening 50, sized to permit the threaded projection 40 and shoulder portion 45 of the plug member 38 to pass therethrough, without passing the enlarged tool-engaging wrench head 43. The other leg 44b includes an opening 52 of similar size and configuration to receive the external dimensions of the body portion 39 of the adaptor member 32 (i.e. hexagonal). When the body portion 46 is in axial alignment within opening 52 there is an abutting interlock against relative rotation therebetween so that adaptor 32 is prevented from inadvertent unthreading.

The upstanding leg 44a of the bracket member also includes a notch 54 to provide non-interfering clearance between the bracket member 44 and hexagonal portion 46 of the adaptor member 32 when the side walls of the opening 52 of the bracket member 44 are in alignment with the recess 29 of the adaptor member 32.

Thus, as further can be seen with respect to FIG. 6 for locking the adaptor member 32 in threaded engagement with the base socket 22, the bracket member 44 when preliminarily assembled is disposed beneath the base face 26 of socket 22 with leg 44b about recess 29. In this arrangement, the hexagonal opening 52 is generally displaced from the underface 26 about the opening 27 into which the adaptor is to be secured, while the circular opening 50 is contiguous to face 24 but axially displaced from the threaded opening 25. When the adaptor is completely assembled, the bracket can be displaced slightly upward from the recess 29 so that the opening 52 cooperates to effect the interlock with body portion 46 of the adaptor 32 (FIG. 7) and plug 38 can be inserted through opening 50.

It will be noted in FIG. 6 that in the preliminary assembly of bracket 44, the axis A of the opening 50 is displaced from the axis A—A of the unused threaded opening 28 of the base socket 22, a distance generally equal to the thickness of the portion 46 of the adaptor member. Thus, once the adaptor member 32 is tightened to its seated engagement within the base socket member 22, and by any overtightening that is necessary to obtain alignment of the sides of the adaptor with the sides of opening 52, the bracket member 44 can be moved upward to the position where the side walls of opening 52 are in axial alignment with the portion 46 of the adaptor member. This also places the axis A of the opening 50 coincident with the axis A—A of the unused opening 28 in the base socket 22. The threaded plug member 38 can then be inserted in the base socket 22 through opening 50 to maintain the bracket in this relationship. In this position, the adaptor member is prevented from further rotation in either direction, thereby locking the adaptor member 32 in its secured relation to the base socket member 22.

Figure 7:
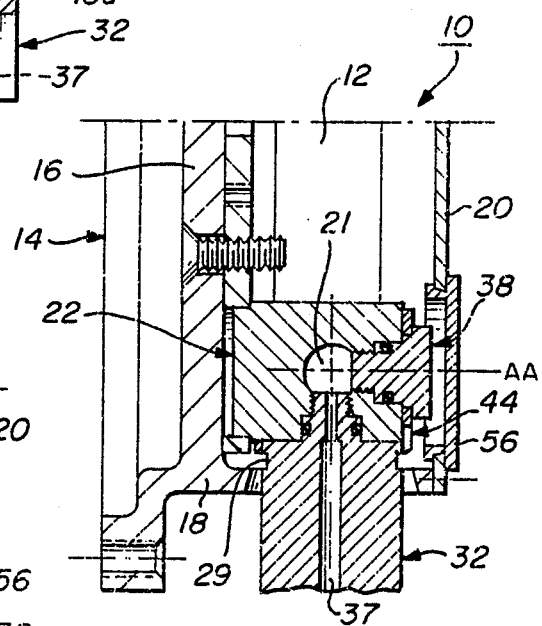
FIG. 7 is a view similar to FIG. 6 with final assembly of the plug in the base socket.

The above-identified relationship is shown as finally assembled in FIG. 7 wherein the plug member 38 retains the bracket member 44 in the locking position and also plugs and seals the unused opening 25 of the base socket member 22. The adaptor member 32 is thereby prevented from rotation with respect to the base socket member 22 by such engagement between the opening 52 of the bracket 44 and the peripheral body wall portion 46 of the adaptor member. Further, as is shown in FIG. 7, a hole plug 56 for the rear cover 20 of the case 14 can then be snapped into position to close opening 20a. This hole plug 56 is configured to fit either within the opening 20a in the rear cover or opening 18a in the cylindrical side wall 18 of the case.

Figure 8:
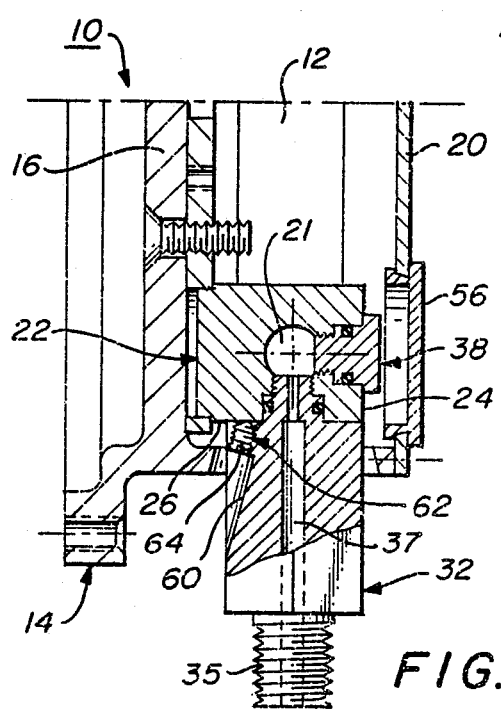
FIG. 8 is a view similar to FIG. 7 of a second embodiment for locking the adaptor to the socket with a locking screw.

Referring now to FIG. 8, an alternative embodiment for locking the adaptor member 32 in assembled relationship on the base socket 22 is shown. In this embodiment, the adaptor member 32 has an angularly directed aperture 60 formed through its side wall terminating in the shoulder opposite the planar face 26 of the base socket 22. A portion 62 of this aperture is threaded and receives a set screw 64 therein which can, after tightening of the adaptor member to the base socket 22, be threaded inwardly to become jammed against the planar face 24 or 26 of the base socket member, thereby preventing relative rotation between the base socket 22 and the adaptor 32. Again, a plug member 38 is employed to plug the non-used opening in the base socket member 22 to complete the assembly and a hole plug 56 for the case is also employed to cover the opening 20a in the case adjacent the plug member 38.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A pressure gauge having a case in which is disposed a Bourdon tube and a base socket connected to the Bourdon tube for placing said tube in pressure communication with a fluid pressure source, said base socket having a rearward face and a bottom face with respect to said gauge adjacent openings defined through said case and an internal passage communicating with said tube and means for connecting a source of fluid pressure to said socket selectively through one of said case openings to said bottom face or said rearward face and comprising:

a first threaded aperture in the bottom face of said socket extending into communication with said internal passage;

a second threaded aperture similar to said first threaded aperture in the rearward face of said socket extending into communication with said internal passage;

said first and second apertures each defining a threaded portion and a concentric counterbore arranged with their respective axes intersecting at a predetermined angle;

threaded plug means having socket engaging threads;

a first seal disposed on said plug means whereby said plug can be threadedly inserted and sealingly plugged in one of said apertures;

an adaptor assembly attachable to said socket through said one case opening and comprising a body having an axial passage extending therethrough and open on both ends, a first end of said body terminating in socket-engaging threads for threadedly connecting to the other of said socket apertures and a second end disposed outward of said case and defining connector threads for attaching to a threaded circuit defining a source of fluid pressure; and a second seal member disposed on said adaptor for sealing the threaded engagement with the other of said apertures.

2. The pressure gauge according to claim 1 in which said seal members and operative to maintain their imposed seals while accommodating axial adjustment of said plug means and said adaptor assembly.

3. The pressure gauge according to claim 1 including locking means for securing said adaptor to said socket in threaded sealing engagement with the other of said socket apertures by opposing unthreading of said adaptor therefrom.

4. The gauge according to claim 3 wherein said locking means comprises:

a third threaded aperture extending from the side of said adaptor to exit said adaptor generally adjacent the socket face in which said other socket aperture is disposed; and, a set screw disposed in said third aperture for projecting from said exit into interfering engagement with the face of said socket thereat to prevent unthreading rotation of said adaptor from said socket.

5. The gauge according to claim 3 wherein said adaptor body defines a non-circular periphery having a locally defined annular recess; and said locking means comprises a generally "L" shaped bracket member having legs defining an included angle generally corresponding to said predetermined angle;

one of said legs defining an aperture through which said plug can extend for securing said bracket to one of said apertures; and the other of said legs having an opening for receiving said adaptor in a complementary rotational interlock with said adaptor body;

6. The gauge according to claim 5 in which the bracket is positionable adjacent the socket base with said other leg opening in registry with said adaptor recess enabling the adaptor to be threaded into said socket by rotation relative to to the bracket, and after threading between the adaptor and the base socket member is completed the bracket can be displaced to abut said base socket member with said other leg opening interlocking the body periphery of the adaptor assembly, whereby the aperture in said one leg is in alignment with the one threaded opening of the base socket member for receipt of said plug means to maintain the bracket in the position preventing unthreaded rotation between the adaptor assembly and the socket.

7. The gauge according to claim 1 in which said plug means and said adaptor assembly can be interchangeably threaded in said first and second apertures for altering the location of said second end connector threads between a lower connected gauge and a back connected gauge.

8. The gauge according to claim 1 in which said adaptor assembly is selected from a plurality adaptor assemblies having variably different second end threads enabling utilization of the gauge with a compatible thread connection at the source of fluid pressure to which the gauge is to be connected.

* * * * *

UNITED STATES PATENT AND TRADEMARK OFFICE
CERTIFICATE OF CORRECTION

PATENT NO. : 4,896,538

DATED : January 30, 1990

INVENTOR(S) : Robert D. Bissell

It is certified that error appears in the above-identified patent and that said Letters Patent is hereby corrected as shown below:

Column 6, line 51 "circuit" should read -- conduit --;

Column 6, line 57, "and" should be -- are --.

Signed and Sealed this

First Day of January, 1991

Attest:

HARRY F. MANBECK, JR.

Attesting Officer

Commissioner of Patents and Trademarks